United States Patent
Elliott et al.

[15] 3,704,416
[45] Nov. 28, 1972

[54] SEQUENTIAL SAMPLING SYSTEM

[72] Inventors: Brian J. Elliott, New York; John L. Staples, Tarrytown, both of N.Y.

[73] Assignee: International Business Machines Corporation, Armonk, N.Y.

[22] Filed: July 13, 1970

[21] Appl. No.: 54,182

[52] U.S. Cl. .............................. 324/121 R, 328/151
[51] Int. Cl. ....................... G01r 13/20, H03k 17/00
[58] Field of Search .............. 324/121; 328/151, 186; 307/257; 315/25

[56] References Cited

UNITED STATES PATENTS

| | | |
|---|---|---|
| 3,011,129 | 11/1961 | Magleby et al. ........ 307/257 X |
| 3,229,212 | 1/1966 | Rogers .................... 328/186 X |
| 3,248,655 | 4/1966 | Kobbe et al. ............ 328/186 X |
| 3,493,875 | 2/1970 | Stuckert .................... 328/151 |
| 3,505,609 | 4/1970 | Varsos et al. .......... 328/151 X |

*Primary Examiner*—Rudolph V. Rolinec
*Assistant Examiner*—Ernest F. Karlsen
*Attorney*—Hanifin and Jancin and George Baron

[57] ABSTRACT

Although conventional sampling techniques give minimum risetime in the oscillography of repetitive electrical waveforms, system timing uncertainties introduce drift and jitter errors which are typically comparable in magnitude to the cathode ray oscilloscope risetime. By using two sampling oscilloscopes in cascade and in conjunction with special triggering methods, it is possible to reduce the drift by a factor of $10^{-3}$ down to a level of less than $10^{-14}$ sec./minute. The use of two sampling oscilloscopes in cascade thereby allows highly effective jitter filtering with the result that the new system has greatly improved accuracy in portraying the waveforms of very fast electrical phenomena.

3 Claims, 6 Drawing Figures

INVENTORS
BRIAN J. ELLIOTT
JOHN L. STAPLES

BY
ATTORNEY

SEQUENTIAL SAMPLING SYSTEM

BACKGROUND OF THE INVENTION

Electronic sampling techniques are commonly used in the oscillography of the repetitive waveforms of fast transients because they have three advantages over conventional single-shot oscillographic methods: (1) improved time resolution and bandwidth, (2) greater linearity, and (3) greater sensitivity (at larger bandwidths).

When a sampling oscilloscope is viewing the fastest waveforms (from tunnel diode step generators), sweep speeds of 10 picoseconds/cm are typical. In this range, the timing errors in the sampling processes are considerable: even the best commercial circuits show time jitter errors of about 20 picoseconds and slow drift of similar magnitude. Jitter and drift are, in practice, typically as great as the risetime of the system and, therefore, they greatly limit the accuracy achieved by direct viewing on the CRT. The jitter, being Gaussian in its probability distribution and rapid, may be readily smoothed out by averaging, but the drift, being highly irregular, slow and asymmetric, cannot be averaged in practice. This prevents the use of averaging as a means of noise and jitter reduction.

To overcome the limitations noted above, a system has been devised for viewing constant repetition rate repetitive signals, whereby the analog output from one sampling oscilloscope is viewed with a second sampling oscilloscope, henceforth called Successive Sampling. A conventional sampling oscilloscope views a repetitive input waveform but experiences time drift of this waveform on the viewing screen. By using successive sampling, the second sampling oscilloscope can be synchronized to follow the drift of the output of the first so that the output of the second remains stationary in its display. The tracking feature is achieved by triggering the second sampling oscilloscope by means of an auxiliary trigger circuit which senses the region of maximum slope of the wavefront of the smoothed output waveform of the first sampling oscilloscope. With the drift removed, the jitter may now be reduced by low-pass filtering, at the output of the second sampler, and the desired waveform is reproduced with the aid of an accurate recorder.

It is a primary object of this invention to employ two sampling oscilloscopes in cascade to reduce drift and jitter errors that normally exist even with the best single sampling oscilloscope now available.

The foregoing and other objects, features and advantages of the invention will be apparent from the following more particular description of the preferred embodiments of the invention as illustrated in the accompanying drawings.

Figure 1:
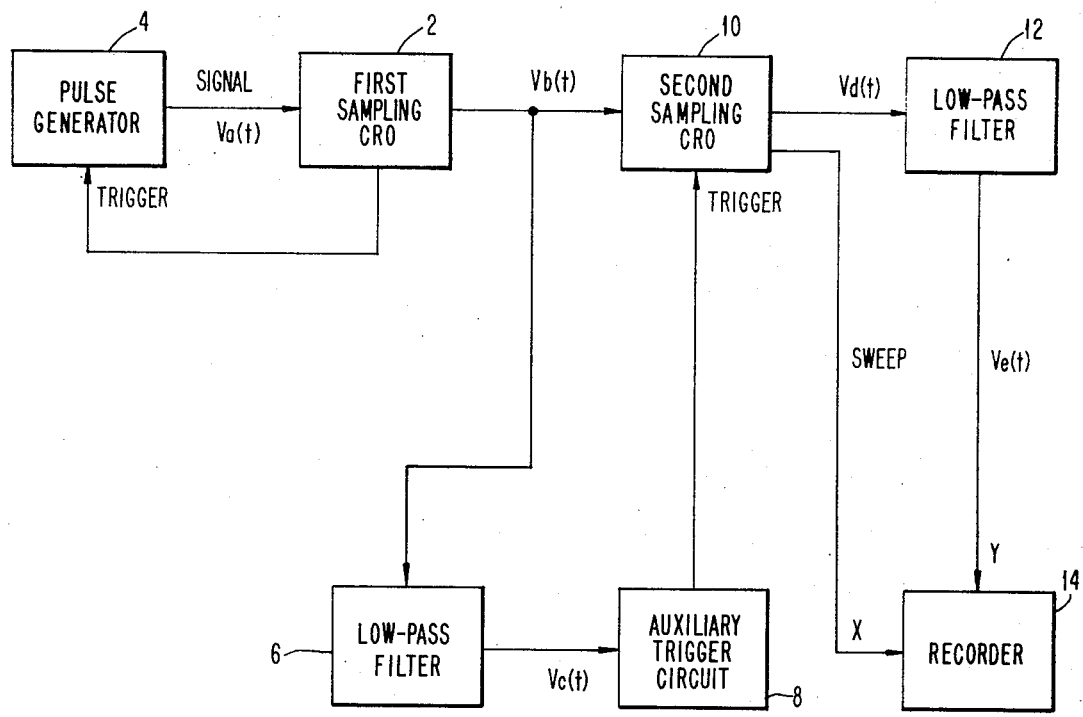
FIG. 1 is a block diagram of the system for achieving a substantially drift-free sampling of very fast risetime pulses.

The preferred embodiment of the invention shown in FIG. 1 includes a first conventional sampling cathode ray oscilloscope 2 that is free-running and triggering a pulse generator 4 that emits, periodically, a uniform pulse $Va(t)$ to be analyzed. The main thrust of the invention to be described herein is to measure the detailed shape of the wavefront $Va(t)$, shown in FIG. 2, with high accuracy.

Figure 3:
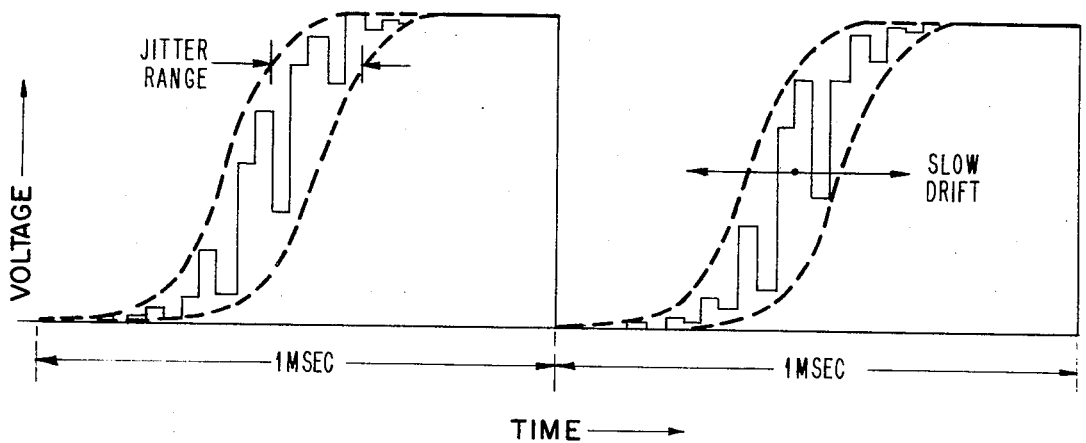
Figure 5:
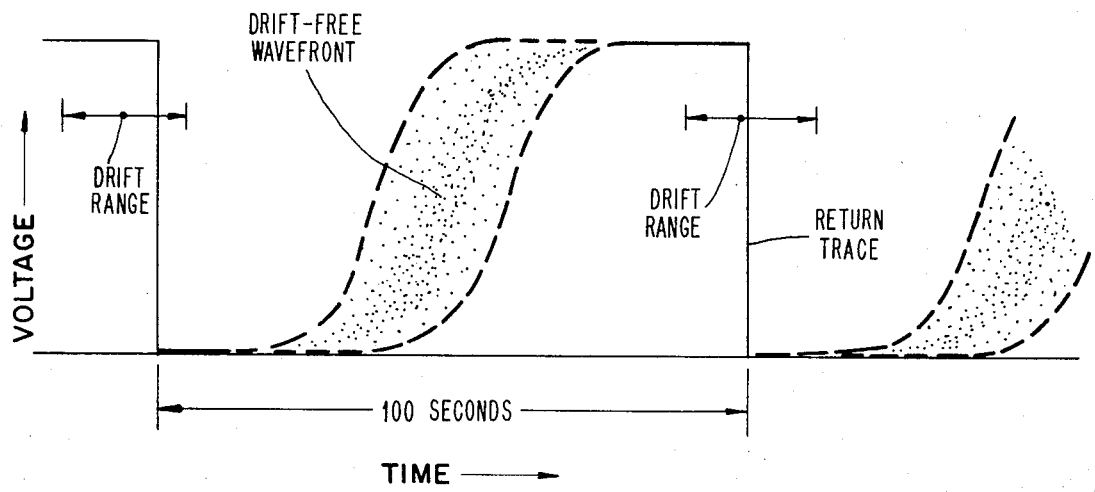
Figure 6:
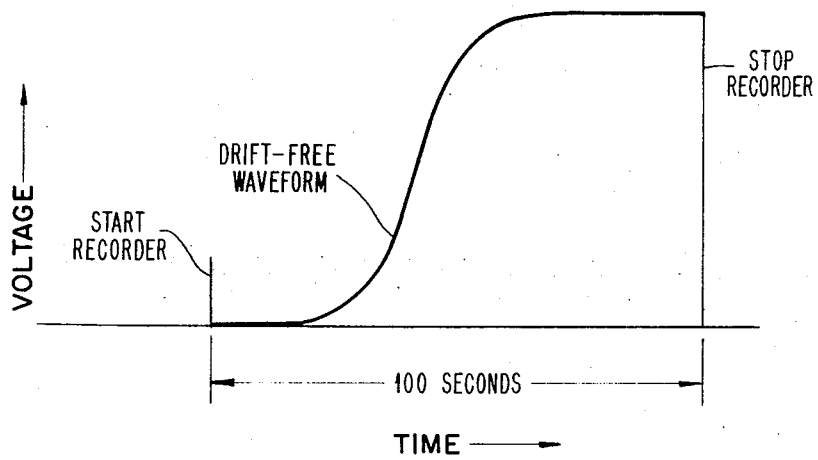

The analog output signal waveform of sampling oscilloscope 2, which is the same as the feedback loop signal from sampling oscilloscope 2 to pulse generator 4, is $Vb(t)$ as seen in FIG. 3. A low-pass filter 6 smoothes $Vb(t)$ to yield $Vc(t)$, such smoothed wavefront $Vc(t)$ (FIG. 4) serving to turn on auxiliary trigger circuit 8, the latter being triggered at a fixed level and generating a delayed step voltage to trigger a second conventional sampling oscilloscope 10. In this manner, a fixed relative reference time, $T_o$, is always maintained with respect to the mean wavefronts of $Vc(t)$, and hence $Vb(t)$, even as these wavefronts drift in time. In a manner to be described in greater detail hereinbelow, such sampling oscilloscope 10 takes a number of drift-free samples from wavefront $Vb(t)$ to produce a drift-free wavefront $Vd(t)$. The latter may still have more time jitter than wavefront $Vb(t)$, but such output waveform $Vd(t)$ (FIG. 5) is smoothed by a second low-pass filter 12 to produce wavefront $Ve(t)$ (FIG. 6), the latter being stored on a suitable recording device 14.

A better understanding of how the system of FIG. 1 operates can be obtained by considering waveforms depicted in FIGS. 2 through 6 in conjunction with the system shown in FIG. 1.

In conventional single sampling oscilloscopes, a time controlled gate, a pulse stretcher, a memory and a display are employed to yield a slowed down replica of a real time waveform. For sampling oscilloscope 2, any well-known unit can be used and models Hewlett-Packard 1430, 1425A, 1411A and 141A are examples of types that were used for sampling oscilloscope 2. The second oscilloscope 10 should have a very high dot density capability as compared to that used for sampling oscilloscope 2. The actual one employed herein for oscilloscope 10 to carry out the invention was a Tektronix S–2, 3S2, 3T2, and a RM564.

Figure 2:
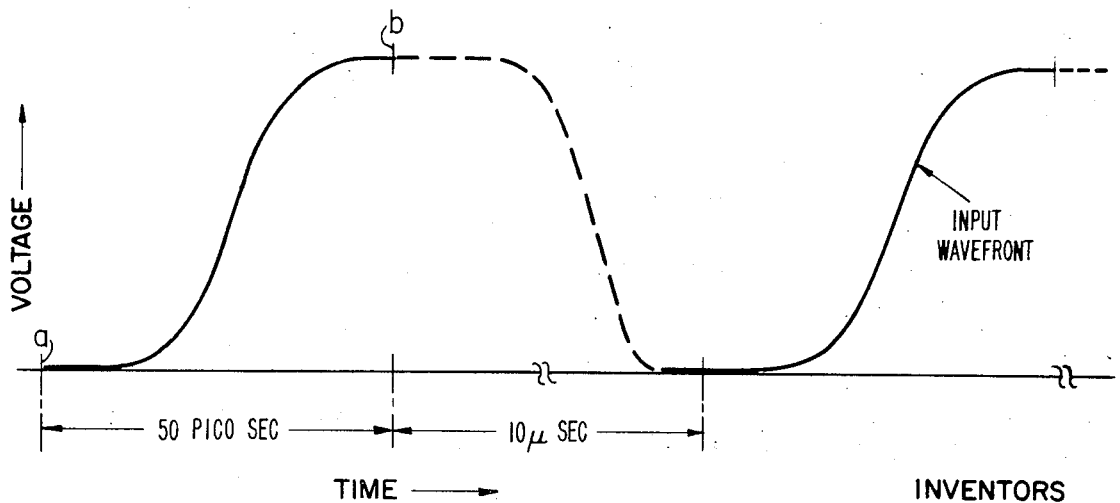
FIGS. 2–6 are various input and output waveforms for aiding in the understanding of the operation of the system of FIG. 1.

When the timebase of the sampling oscilloscope 2 is free-running at a pulse repetition frequency $f_o$, which is typically $10^5$ pulses per second, and pulse generator 4 is a triggered tunnel diode, the latter emits a pulse whose input waveform is $Va(t)$ as shown in FIG. 2. The purpose of the successive sampling system forming the present invention is to measure the detailed shape of the 50 picosecond pulse (from $a$ to $b$) with high accuracy. As seen in FIG. 2, repetitive pulses to be measured recur every 10 microseconds (T) as the pulse generator 4 is triggered by sampling oscilloscope 2.

The analog output of sampling oscilloscope 2 is shown in FIG. 3 as waveform $Vb(t)$. FIG. 3 is a slowed down replica of the desired wavefront (from $a$ to $b$ of FIG. 1), but with the addition of numerous unwanted aberrations, such as slow drift, fast jitter and sampling noise. The number of samples taken of the desired wavefront is $n_1$, typically 100, so that the time $n_1T$ of 1 millisecond is required for such number of samples. The pulse repetition frequency $f_1 = f_o/n_1$ would be of the order of a 1,000 pulses per second. In FIG. 3, $n_1$ is made small for illustrative purposes and the unwanted aberrations due to jitter is illustrated when a single sampling oscilloscope is used to reproduce a waveform $Vb(t)$.

Figure 4:
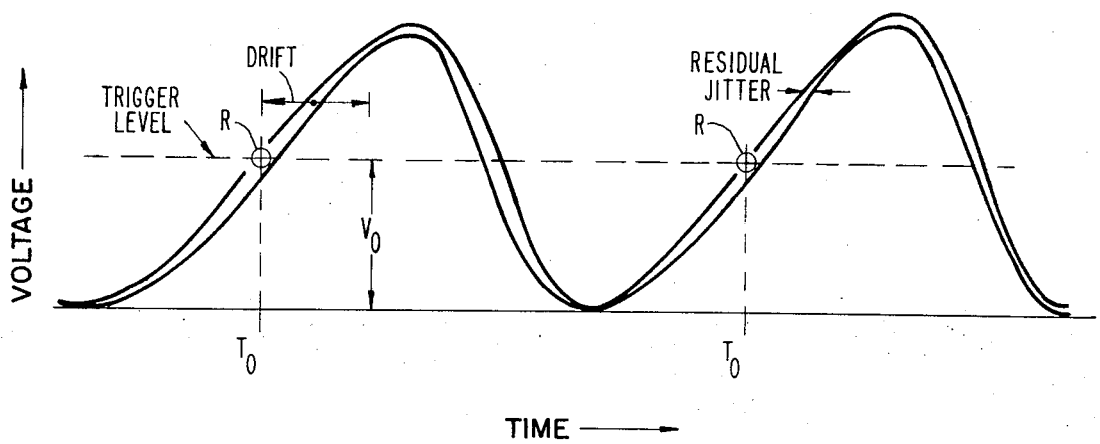

The low-pass filter 6 serves to smooth out waveform $Vb(t)$ of FIG. 3 by averaging out the jitter to produce the smoother waveform $Vc(t)$ shown in FIG. 4. Some residual jitter-induced noise remains, as shown in FIG. 4, but its effect is negligible. This smoother waveform drives the auxiliary trigger circuit 8. The latter is always triggered at a predetermined voltage level $V_o$. Hence a fixed relative reference time $T_o$ is determined for each wavefront of $Vb(t)$. Then the trigger circuit 8 generates a delayed signal to trigger the second sampling oscilloscope 10. In this manner the second oscilloscope 10 is slaved to follow the drift of the output of the first sampling oscilloscope 2 so that the output wavefront of the second oscilloscope remains stationary. This relative non-movement is achieved in the following way. The second sampling oscilloscope 10 is triggered by means of the auxiliary trigger circuit 8 which senses and thereby automatically corrects for the relative slow motion (drift) of the output waveform $Vb(t)$ of the first sampling oscilloscope 2. It is important that the relative time positions of the repetitive wavefronts $Vc(t)$ exactly follow the mean positions of the noisier wavefronts $Vb(t)$.

This is so because the drifting sampled signal $Vb(t)$ is fed into the low-pass filter 6 to produce $Vc(t)$. The purpose of the low-pass filter 6 is simply to reduce the amount of time jitter that is transferred to $Vd(t)$ (See FIG. 5) when the second sampling oscilloscope 10 is triggered. In this way, the noisy, but now drift-free, output $Vd(t)$ has less jitter-induced noise and therefore requires less filtering by low-pass filter 12. This in turn reduces the amount of time needed to accurately average and record the highly smoothed output waveform $Ve(t)$ shown in FIG. 6. With the drift removed, the jitter may now be reduced by low-pass filtering, at the output of the second oscilloscope and the desired waveform can be accurately reproduced with the aid of a recorder or a computer.

The invention, as shown and described above, has reduced drift by a factor of $10^{-3}$ so that absolute time calibration is possible with a $3 \times 10^{-14}$ sec. resetting capability and fast waveforms may be accurately recorded with a time measurement uncertainty of $10^{-13}$ sec.

What is claimed is:

1. A sequential sampling system for eliminating the effects of the inherent drift of single sampling systems, comprising:

a cascaded pair of sampling oscilloscopes wherein the repetitive analog output signal of the first sampling oscilloscope, produced by sampling a repetitive input signal thereto, is coupled to a second sampling oscilloscope, a triggering means having the output thereof coupled to said second sampling oscilloscope for controlling the sampling time of said second sampling oscilloscope in accordance with the trigger pulses therefrom responsive to be initiated by the said repetitive output signal of said first sampling oscilloscope so as to thereby avoid the effects due to drift in said first oscilloscope, a low-pass filter means coupling the said repetitive output signal of said first sampling oscilloscope to said triggering means so as to thereby diminish the time-jitter that would normally be transmitted through said trigger circuit to said second sampling oscilloscope, and cause said triggering means to sense in time, a point of fixed height on a region substantially at the maximum slope of the respective repetitive waveforms of said repetitive output signal of the first sampling oscilloscope to thereby produce said trigger pulses so that the second sampling oscilloscope is thereby synchronized to follow the drift introduced by the first sampling oscilloscope whereby the output signal of said second sampling oscilloscope is displayed as a stationary waveform.

2. The system of claim 1 wherein means including recording means are connected to said second sampling oscilloscope for recording the drift-free, sloweddown replica of said repetitive input signal, said means further including a low-pass filter interconnected between the output signal of said second sampling oscilloscope and said recording means so that the time-jitter of said output waveform is effectively removed without distortion.

3. A sequential sampling system for reducing the drift normally occurring in a single sampling oscilloscope, comprising:

signal producing means for producing a repetitive signal;

a first sampling oscilloscope means coupled to said signal producing means for sampling said repetitive signal therefrom and providing a reproduced repetitive signal at the output thereof;

trigger-circuit means coupled to the said output of said first sampling oscilloscope means and responsive to be triggered by said reproduced repetitive signal therefrom to produce an output pulse each time said reproduced signal reaches a predetermined voltage level;

second sampling oscilloscope means coupled to the said output of said first sampling oscilloscope means and to said trigger-circuit means to sample said reproduced repetitive signal from the said output of said first sampling oscilloscope means each time a pulse is produced by said trigger-circuit means so as to thereby cause said second sampling oscilloscope means to be synchronized to follow the drift introduced into said reproduced repetitive signal by said first sampling oscilloscope means, whereby the output signal of said second sampling oscilloscope means is stationary.

* * * * *